United States Patent [19]
Thompson

[11] Patent Number: 5,646,970
[45] Date of Patent: Jul. 8, 1997

[54] CORE PLATE REPAIR USING CONTROL ROD GUIDE TUBE LOAD TRANSFER COLLAR

[75] Inventor: Jeffrey Lee Thompson, San Jose, Calif.

[73] Assignee: General Electric Company, San Jose, Calif.

[21] Appl. No.: 664,605

[22] Filed: Jun. 18, 1996

[51] Int. Cl.$^6$ .................................................. G21C 13/00
[52] U.S. Cl. ........................... 376/260; 376/353; 376/347
[58] Field of Search ..................................... 376/260, 277, 376/285, 347, 353, 362

[56] References Cited

U.S. PATENT DOCUMENTS 4,904,443  2/1990  Carruth ................................. 376/353

Primary Examiner—Daniel D. Wasil
Attorney, Agent, or Firm—James E. McGinness

[57] ABSTRACT

A method and an apparatus for repairing a core plate having a cracked support structure. The method entails the step of providing a vertical compression load path between the core plate and one or more control rod guide tubes. This is accomplished by installing a plurality of load-bearing elements between the core plate and the flanges of the guide tubes. Each load-bearing element is placed between the core plate and a guide tube flange so that core plate pressure loads are reacted by the weight of the fuel rather than the core plate support structure. The load-bearing element may take the form of a solid ring, a C-shaped spring collar or a hinged collar.

18 Claims, 2 Drawing Sheets

CORE PLATE REPAIR USING CONTROL ROD GUIDE TUBE LOAD TRANSFER COLLAR

FIELD OF THE INVENTION

This invention generally relates to techniques for the repair of cracked components of light water nuclear reactors. In particular, the invention relates to remotely installed hardware for restraining upward deflection of a core plate having a cracked support structure.

BACKGROUND OF THE INVENTION

As seen in FIG. 1, a conventional boiling water reactor has a reactor pressure vessel 10 and a core shroud 12 arranged concentrically in the reactor pressure vessel with an annular region, namely, the downcomer annulus 14, therebetween. The core shroud 12 is a stainless steel cylinder surrounding the nuclear fuel core. In particular, the core shroud 12 comprises a shroud head flange 12a for supporting the shroud head (not shown); a circular cylindrical upper shroud wall 12b having a top end welded to shroud head flange 12a; an annular top guide support ring 12c welded to the bottom end of upper shroud wall 12b; a circular cylindrical middle shroud wall welded assembly 12d welded to the top guide support ring 12c; and an annular core plate support ring 12e welded to the bottom of the middle shroud wall 12d and to the top of a lower shroud wall 12f. As seen in FIG. 1, the shroud 12 is vertically supported by a plurality of shroud support legs 16, each of the latter being welded to the bottom head of the reactor pressure vessel 10. The shroud is laterally supported by an annular shroud support plate 18, which is welded at its inner diameter to the shroud 12 and at its outer diameter to the reactor pressure vessel 10. The shroud support plate 18 has a plurality of circular apertures 20 in flow communication with the diffusers of a plurality of jet pump assemblies (not shown), The fuel core of a BWR consists of a multiplicity of upright and parallel fuel bundle assemblies 22 arranged in 2×2 arrays, each assembly consisting of an array of fuel rods inside a fuel channel made of zirconium-based alloy. Each array of fuel bundle assemblies is supported at the top by a top guide 24 and at the bottom by a core plate 26. The core top guide 24 provides lateral support for the top of the fuel assemblies; the core plate 26 provides lateral support for the bottom of the fuel assemblies. This lateral support maintains the correct fuel channel spacing in each 2×2 array to permit vertical travel of a cruciform control rod blade 28 in between the fuel channels.

The power level of the reactor is maintained or adjusted by positioning the control rods 28 up and down within the core while the fuel bundle assemblies 22 are held stationary. Each control rod 28 has a cruciform cross section consisting of four wings at right angles. Each wing consists of a multiplicity of parallel tubes welded in a row, each tube containing stacked capsules filled with neutron-absorbing material. Each control rod is raised or lowered inside a control rod guide tube 30 by a control rod drive (not shown) which is releasably coupled by a spud (not shown) at its top to a socket in the bottom of the control rod.

Control rod drives are used to position control rods in BWRs to control the fission rate and fission density, and to provide adequate excess negative reactivity to shutdown the reactor from any normal operating or accident condition at the most reactive time in core life. Each control rod drive is mounted vertically in a control rod drive housing 32 which is welded to a stub tube 34, which in turn is welded to the bottom head of the reactor pressure vessel 10. The control rod drive is a double-acting, mechanically latched hydraulic cylinder. The control rod drive is capable of inserting or withdrawing a control rod (not shown) at a slow controlled rate for normal reactor operation and of providing rapid control rod insertion (scram) in the event of an emergency requiring rapid shutdown of the reactor.

The control rod drive housing 32 has an upper flange that bolts to a lower flange of the guide tube 30. Each guide tube 30 sits on top of and is vertically supported by its associated control rod drive housing 32. The uppermost portion of the guide tube penetrates a corresponding circular aperture in the core plate 26. There are typically 140 guide tubes penetrating an equal number of circular apertures in the core plate, each aperture having a diameter slightly greater than the outer diameter of the guide tube.

Referring to FIG. 2, each guide tube 30 has a machined step at the top edge thereof which forms a flange 30a. A pair of lugs 30b and 30c project radially outward at diametrally opposite positions on flange 30a. The guide tube lug 30b has a slot (not shown) of width slightly greater than the diameter of a vertical guide pin 36 mounted on the core plate. During installation, the guide tube 30 must be rotated until the lug slot lines up with the guide pin 36. A fuel support casting 38 sits on top of the guide tube and has a 2×2 square array of openings. The fuel bundle assemblies 22 of each array are lowered through the square opening in the top guide and onto the fuel support casting. The fuel bundle assemblies are vertically supported by the fuel support casting during reactor operation.

The control rod drive housings and guide tubes have two functions: (1) to house the control rod drive mechanisms and the control rods, respectively, and (2) to support the weight of the fuel. The fuel weight is reacted at the orifice fuel support casting 38 which sits in the top of the guide tube 30. The control rod drive guide tubes and housings act as columns carrying the weight of the fuel.

The top guide 24 provides lateral support to the upper end of the fuel bundle assemblies 22, neutron monitoring instrument assemblies (not shown) and installed neutron sources (not shown), and maintains the correct fuel channel spacing to permit control rod insertion. The top guide 24 is designed so that during periodic refueling operations, the fuel bundle assemblies 22 can be lifted out of and lowered into the core without removing the top guide. One type of top guide installed in certain types of BWRs has a fabricated design comprising a lattice of interlocking upper and lower beams held together by a large circular ring. The circular ring of the top guide sits on the top guide support ring 12c of the shroud 12, and is provided with radially inwardly directed flanges that capture the distal ends of the beams.

The core plate 26 is bolted to and supported by the core plate support ring 12e. The core plate of a BWR has two functions: (1) to act as a flow barrier directing the flow of coolant water through the fuel channels containing the fuel rods to maximize heat transfer; and (2) to provide lateral restraint for the fuel channels by restraining horizontal movement of the control rod guide tubes 30. The pressure across the core plate 26 results in an upward load that is carried by the core plate and its underlying support structure 40.

During operation of the reactor, water is continuously recirculated down the downcomer annulus 14, into the lower plenum 42 and then up through the core. This flow is induced by a multiplicity of jet pumps (not shown) located in the downcomer annulus and driven by recirculation pumps (not shown) outside the reactor pressure vessel 10. The water in the lower plenum 42 enters the core via a plurality of flow inlets 44 in the guide tube. Each flow inlet 44 (see FIG. 2) is in flow communication with an opening at the bottom of a corresponding fuel channel via a corresponding opening formed in the fuel support casting 38. The fuel support casting has four such openings in a square array with a cruciform opening for passage of the control rod blade therebetween. The alignment of the lug slot with the guide pin 36 ensures that the fuel support casting will be properly oriented relative to the corresponding square opening in the top guide 24 to allow the fuel channel openings to align with the fuel support casting openings when the fuel bundle assemblies are lowered through the top guide and into position. During reactor operation, water flows upwardly through the fuel channels and acts as both a coolant for removing heat and a moderator for stopping neutrons.

Stress corrosion cracking (SCC) is a known phenomenon occurring in reactor components, such as the core plate support structure, which are exposed to the high-temperature water environment inside a BWR. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding or cold working. In addition, water chemistry, welding, heat treatment, and radiation can increase the susceptibility of metal in a component to SCC.

Postulated cracking of the core plate support structure could result in loss of core plate support, resulting in uncontrolled loads on the control rod drive housings. Loss of core plate support would result in upward movement of the core plate caused by pressure under the plate. Thus, there is a need for a remotely installable means for repairing damaged core plates.

SUMMARY OF THE INVENTION

The present invention is a method and an apparatus for repairing a core plate having a cracked support structure. The method entails the step of providing a vertical compression load path between the core plate and one or more control rod guide tubes. This is accomplished by installing a plurality of load-bearing elements between the core plate and the flanges of the guide tubes. Each load-bearing element is placed between the core plate and a guide tube flange so that core plate pressure loads are reacted by the weight of the fuel rather than the core plate support structure.

In accordance with one preferred embodiment of the invention, the repair apparatus is a solid ring which fits snugly around the guide tube at an elevation between the guide tube flange and the core plate. The solid ring has an inner diameter which is greater than the outer diameter of the guide tube but less than the outer diameter of the guide tube flange. This solid ring must be installed before installation of the guide tube during reactor construction or after removal of the fuel bundle assembly, the fuel support casting and the guide tube during reactor maintenance. The ring is placed on top of the core plate in a position coaxial with a circular aperture in the core plate. Then the guide tube is lowered through the solid ring and core plate aperture and bolted to the top of the control rod drive housing directly under the aperture.

In accordance with another preferred embodiment of the invention, a C-shaped spring collar made of spring steel is installed between the guide tube flange and the core plate. Installation of a C-shaped spring collar requires the removal of the fuel support casting, but not the guide tube. With the guide tube in place, the C-shaped spring collar is flexed partly open until the collar can be passed over the guide tube flange. The spring is then released to restore its original shape, in which the inner periphery of the collar is an arc having a radius of curvature slightly greater than the radius of the guide tube. In an unflexed state, the distance separating the distal ends of the collar is less than the diameter of the guide tube, preventing lateral disengagement of the collar from the guide tube. Subsequent upward movement of the core plate will compress the collar, thereby transferring the pressure load to the control rod drive housing assembly via the guide tube.

In accordance with a further preferred embodiment of the invention, the repair apparatus is a hinged collar which can be clamped onto the guide tube. This collar comprises a pair of semicircular collar halves which form a circle when closed. The collar halves are pivotably coupled by a clevis having a clevis pin lying parallel to the collar axis. The collar halves can be rotated between open and closed positions. In the open position, the collar halves can clear the guide tube flange. Then the collar is closed and bolted with its semicircular halves interposed between the guide tube flange and the core plate. In the closed position, the collar has an inner diameter slightly greater than the outer diameter of the guide tube, but less than the outer diameter of the guide tube flange.

Thus, the close proximity of the guide tube and the core plate holes facilitates the transfer of upward loads from the core plate to the guide tubes. The collars in accordance with the invention restrain the core plate from upward displacement beyond a certain limit and transfer loads from the core plate to the guide tubes. The transfer of loads from the core plate to the guide tubes ensures that, even if extensive cracking of the core plate support structure occurs, an alternate load path is available which will limit stresses in the core plate and limit crack propagation in the support structure.

Any device that provides a vertical load path between the core plate and guide tubes is within the scope of the present invention. For example, another implementation of this repair concept uses harness collars engaging multiple guide tubes.

DETAILED DESCRIPTION OF THE PREFERRED EMBODIMENTS

Figure 1:
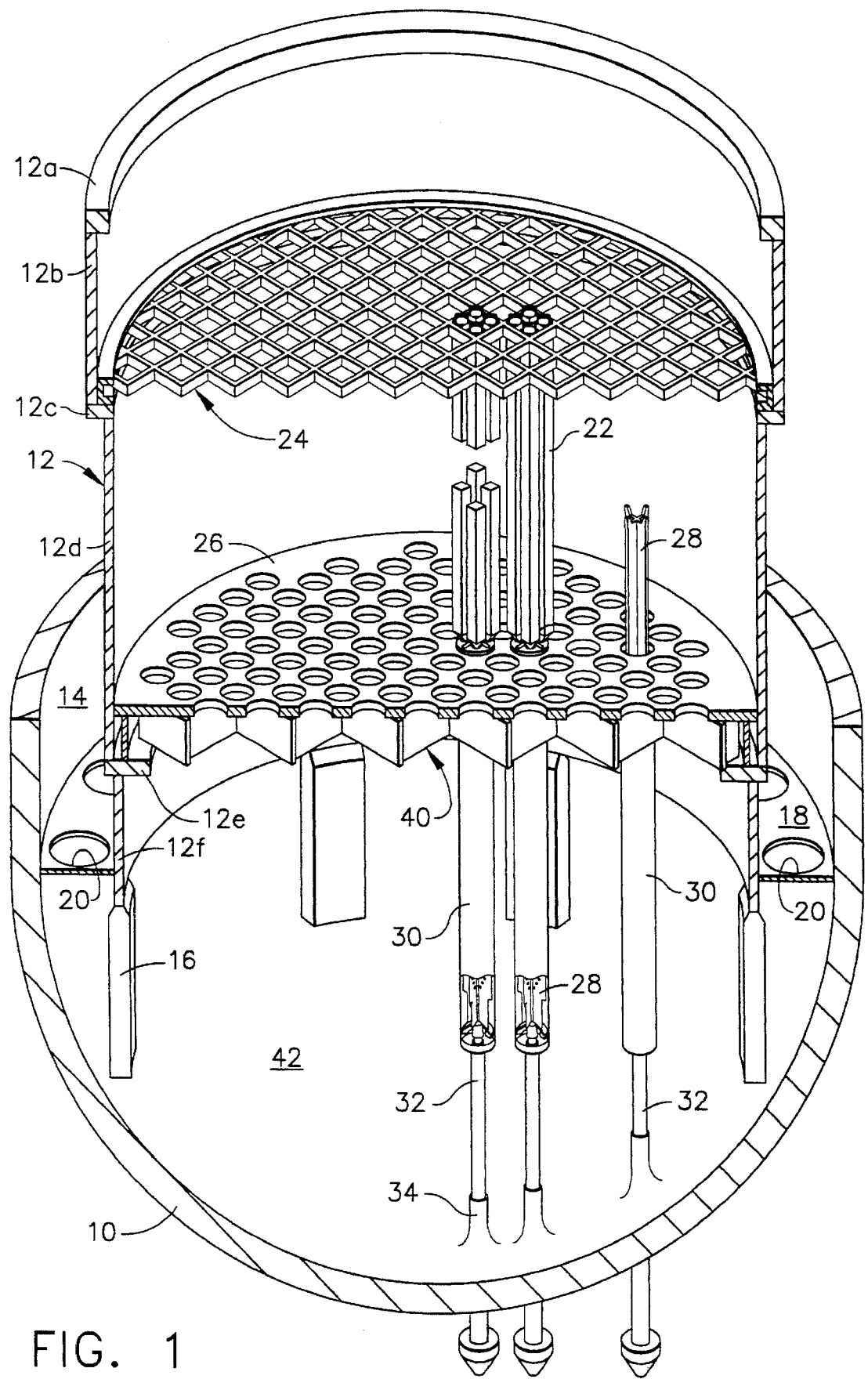
FIG. 1 is a schematic diagram showing an isometric view of portions of a boiling water reactor which are pertinent to the present invention.
Figure 2:
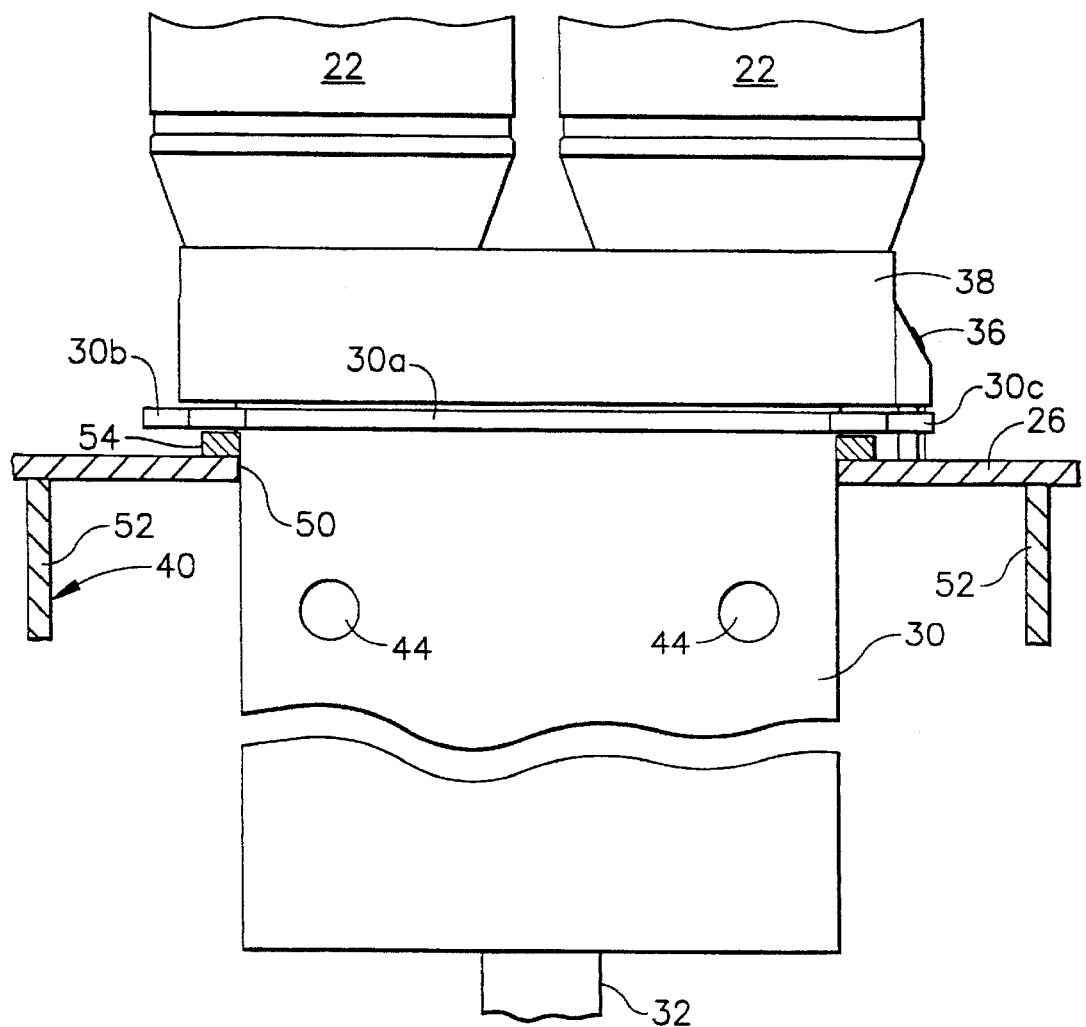
FIG. 2 is a schematic diagram showing a sectional view of a repair ring installed between the core plate and a guide tube flange in accordance with the present invention.

As best seen in FIG. 2, a guide tube 30 passes through a circular aperture 50 in the core plate 26. The guide tube extends vertically downward and is bolted to the top of the control rod drive housing 32. The support structure 40 comprises a lattice of beams 52, only two of which appear in FIG. 2. The beams are welded to the core plate 26 and serve to stiffen the core plate. The stiffened core plate is less susceptible to vertical vibrations during reactor operation and vertically upward displacement of the core plate in response to the pressure exerted on its undersurface by upwardly flowing coolant water in lower plenum 42 (see FIG. 1) is restrained.

In the postulated event of extensive cracking of the support structure, the core plate is not restrained against vertical vibrations and upward displacement in response to the water pressure in the lower head of the reactor pressure vessel. In accordance with a preferred embodiment shown in FIG. 2, the core plate is restrained against upward displacement by installation of a solid ring 54 between the core plate 26 and the guide tube flange 30a. The solid ring 54 fits in a gap which separates the core plate and the guide tube flange. Preferably, ring 54 is in the shape of an annular disk having an inner diameter slightly greater than the outer diameter of the guide tube 30 and less than the outer diameter of the flange 30a. This annular disk has planar upper and lower annular surfaces separated by a constant thickness, i.e., the upper and lower surfaces are parallel. The thickness must be less than the height of the gap between the core plate 26 and the guide tube flange 30a. When the core plate is deflected upward by a sufficient amount, the upper surface of ring 54 will bear against the undersurface of guide tube flange 30a, in which event the latter acts as a stop to further upward deflection of the abutting core plate section.

Figure 3:
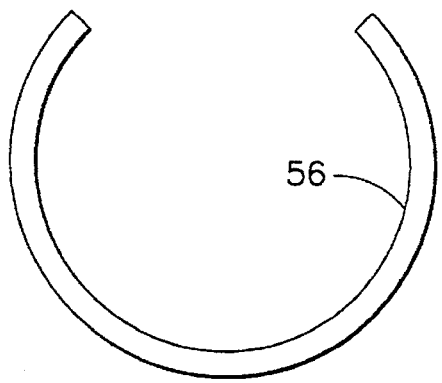
FIG. 3 is a schematic diagram showing a plan view of a core plate repair collar in accordance with one preferred embodiment of the invention.

In accordance with another preferred embodiment of the invention (shown in FIG. 3), a C-shaped spring collar 56 made of spring steel is installed between the guide tube flange and the core plate. In an unflexed state, the spring collar 56 has the shape of an arc having a radius of curvature slightly greater than the outer radius of the guide tube, and the distance separating the distal ends of the collar is less than the diameter of the guide tube. This arc-shaped spring collar preferably has planar upper and lower surfaces separated by a constant thickness, i.e., the upper and lower surfaces are parallel. Again, the thickness must be less than the height of the gap between the core plate 26 and the guide tube flange 30a.

Figure 4:
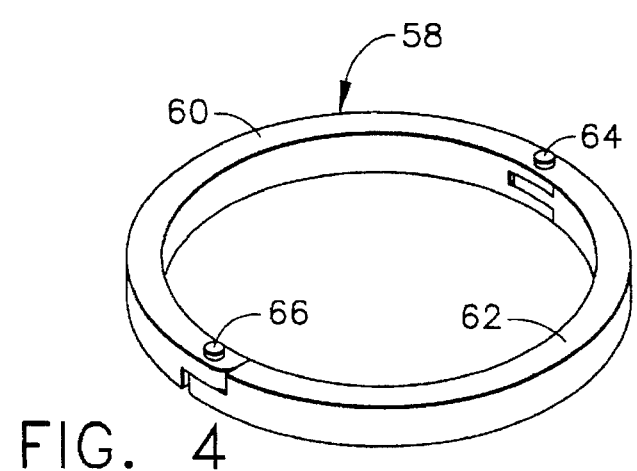
FIG. 4 is a schematic diagram showing a plan view of a core plate repair collar in accordance with another preferred embodiment of the invention.

In accordance with a further preferred embodiment of the invention (shown in FIG. 4), a hinged collar 58 is installed between the guide tube flange and the core plate. This collar comprises a pair of semicircular collar halves 60 and 62 which are pivotably coupled by a clevis having a clevis pin 64 lying parallel to the collar axis. The clevis pin 64 is securely mounted in one of the collar halves; the other collar half is pivotably mounted on the clevis pin. The collar halves can be rotated between open and closed positions. In the open position, the collar halves can clear the guide tube flange. Then the collar is closed and clamped to the guide tube by means of a suitable fastener, e.g., a bolt 66 which threadably engages aligned threaded bores formed in the collar halves. The bolt is secured against vibration-induced loosening by any suitable means, e.g., tack welding the bolt head to the abutting collar half. In the closed position, the collar has a circular inner circumference of diameter slightly greater than the outer diameter of the guide tube, but less than the outer diameter of the guide tube flange.

The C-shaped spring collar 56 and the hinged collar 58 are preferably made of a material having high strength and high resistance to corrosion in the high-temperature, high-radiation reactor environment. One suitable material is XM-19 stainless steel.

The preferred embodiments of the present invention have been disclosed for the purpose of illustration. Variations of and modifications to those embodiments will be readily apparent to persons skilled in the art. All such variations and modifications are intended to be encompassed by the claims appended hereto.

I claim:

1. A method for restraining upward displacement of a core plate of a nuclear reactor, comprising the step of interposing a mechanical structure between the core plate and a guide tube flange to block the core plate from getting closer than a predetermined distance to the guide tube flange.

2. The method as defined in claim 1, further comprising the steps of removing a fuel bundle assembly and a fuel support casting before interposing said mechanical structure.

3. The method as defined in claim 1, wherein said interposing step comprises the steps of:

placing a circular ring on top of the core plate and generally coaxial with an aperture in the core plate, said circular ring having an inner diameter greater than a diameter of the aperture; and lowering a guide tube through said circular ring and through the aperture.

4. The method as defined in claim 1, wherein said mechanical structure has a first configuration in which a guide tube flange can pass through said mechanical structure and a second configuration in which said guide tube can pass through said mechanical structure but said guide tube flange cannot, further comprising the steps of:

configuring said mechanical structure to have said first configuration;

passing said mechanical structure having said first configuration over the guide tube flange; and positioning said mechanical structure at an elevation between the core plate and the guide tube flange, wherein said interposing step comprises the step of configuring said positioned mechanical structure to have said second configuration.

5. The method as defined in claim 4, further comprising the step of securing said mechanical structure in said second configuration.

6. The method as defined in claim 4, wherein said step of configuring said mechanical structure to have said first configuration comprises the step of flexing said mechanical structure.

7. In a boiling water reactor comprising:

a reactor pressure vessel having a lower head;

a vertically disposed control rod drive which penetrates said lower head of said reactor pressure vessel;

a vertically disposed housing for said control rod drive, said control rod drive housing being vertically supported by said lower head of said reactor pressure vessel;

a vertically disposed control rod coupled to said control rod drive;

a vertically disposed guide tube for said control rod, said guide tube being vertically supported by said control rod drive housing and having a flange at a top end thereof; a nuclear fuel core arranged inside said reactor pressure vessel, said fuel core comprising a vertically disposed fuel bundle assembly;

a shroud arranged inside and generally concentric to said reactor pressure vessel;

a top guide supported by said shroud at a first elevation, said top guide providing lateral support to said fuel bundle assembly;

a core plate supported by said shroud at a second elevation below said first elevation, said core plate providing lateral support to said guide tube; and a fuel support casting vertically supported by said top end of said guide tube, said fuel bundle assembly being vertically supported on said fuel support casting, the improvement comprising a mechanical structure interposed between said core plate and said guide tube flange, wherein said mechanical structure blocks said core plate from getting closer than a predetermined distance to said guide tube flange during upward deflection of said core plate.

8. The boiling water reactor as defined in claim 7, wherein said mechanical structure is a solid ring.

9. The boiling water reactor as defined in claim 7, wherein said mechanical structure is a C-shaped spring collar.

10. The boiling water reactor as defined in claim 7, wherein said mechanical structure is a hinged collar.

11. The boiling water reactor as defined in claim 10, wherein said hinged collar comprises first and second collar halves; a pivot pin which pivotably couples said first and second collar halves to each other; and a threaded fastener which fixedly couples said first and second collar halves to each other to prevent relative rotation of said first and second collar halves about said pivot pin.

12. The boiling water reactor as defined in claim 7, wherein said mechanical structure has an inner diameter greater than an outer diameter of said guide tube but less than a diameter of said guide tube flange.

13. A method for repairing a boiling water reactor having a weakened core plate support structure, comprising the step of installing a load-bearing element so that a portion thereof is interposed between a core plate and a guide tube flange, said interposed portion having a height which is less than a distance separating the core plate and the guide tube flange, whereby the core plate is blocked from getting closer than a predetermined distance to the guide tube flange, said predetermined distance being equal to said height of said interposed portion of said load-bearing element.

14. The method as defined in claim 13, further comprising the steps of removing a fuel bundle assembly and a fuel support casting before installing said load-bearing element.

15. The method as defined in claim 13, wherein said installing step comprises the steps of:

placing a circular ring on top of the core plate and generally coaxial with an aperture in the core plate, said circular ring having an inner diameter greater than a diameter of the aperture; and lowering a guide tube through said circular ring and through the aperture.

16. The method as defined in claim 13, wherein said load-bearing element has a first configuration in which a guide tube flange can pass through said mechanical structure and a second configuration in which said guide tube can pass through said load-bearing element but said guide tube flange cannot, and said installing step comprises the steps of:

configuring said load-bearing element to have said first configuration;

passing said load-bearing element having said first configuration over the guide tube flange;

positioning said load-bearing element at an elevation between the core plate and the guide tube flange; and configuring said positioned load-bearing element to have said second configuration.

17. The method as defined in claim 16, further comprising the step of securing said load-bearing element in said second configuration.

18. The method as defined in claim 16, wherein said step of configuring said load-bearing element to have said first configuration comprises the step of flexing said load-bearing element.

* * * * *